Sept. 5, 1933. O. J. SUNDSTRAND 1,925,735
MOTOR DRIVEN ACTUATING MECHANISM FOR COMPUTING MACHINES
Filed Oct. 14, 1929 3 Sheets-Sheet 1

Inventor:
O. J. Sundstrand,
By Chindahl Parker Carlson
Attys.

Sept. 5, 1933.  O. J. SUNDSTRAND  1,925,735

MOTOR DRIVEN ACTUATING MECHANISM FOR COMPUTING MACHINES

Filed Oct. 14, 1929  3 Sheets-Sheet 3

Inventor:
O. J. Sundstrand,
By Churchill Parker Carlson
Attys.

Patented Sept. 5, 1933

1,925,735

UNITED STATES PATENT OFFICE 1,925,735

MOTOR DRIVEN ACTUATING MECHANISM FOR COMPUTING MACHINES

Oscar J. Sundstrand, Rockford, Ill., assignor to Sundstrand Corporation, Wilmington, Del., a corporation of Delaware Application October 14, 1929. Serial No. 399,612

9 Claims. (Cl. 235—62)

One object of the invention is to provide a new and improved motor driven actuating mechanism for computing machines which is simple and compact and such as to positively drive the machine through a complete cycle.

Another object of the invention is the production of a unitary motor driven actuating mechanism in the form of an attachment which may be separately assembled and readily applied to computing machines of the portable hand operated type in such manner as not to impair their portable character or complicate their operation.

Another object is to provide a self-contained motor drive unit for attaching to computing machines in which a driven member is positively operated through a single complete cycle and automatically brought to rest in a predetermined position as an incident to its operation and in which the cyclic movements are initiated and concluded by a single member under the control of an operating key.

In the accompanying drawings:

Figure 1 is a fragmental side elevation of a preferred form of motor actuating mechanism and its operating connection with the machine, the device being illustrated as at rest.

Fig. 1ª is a detail view of a certain crank arm.

Figure 1:
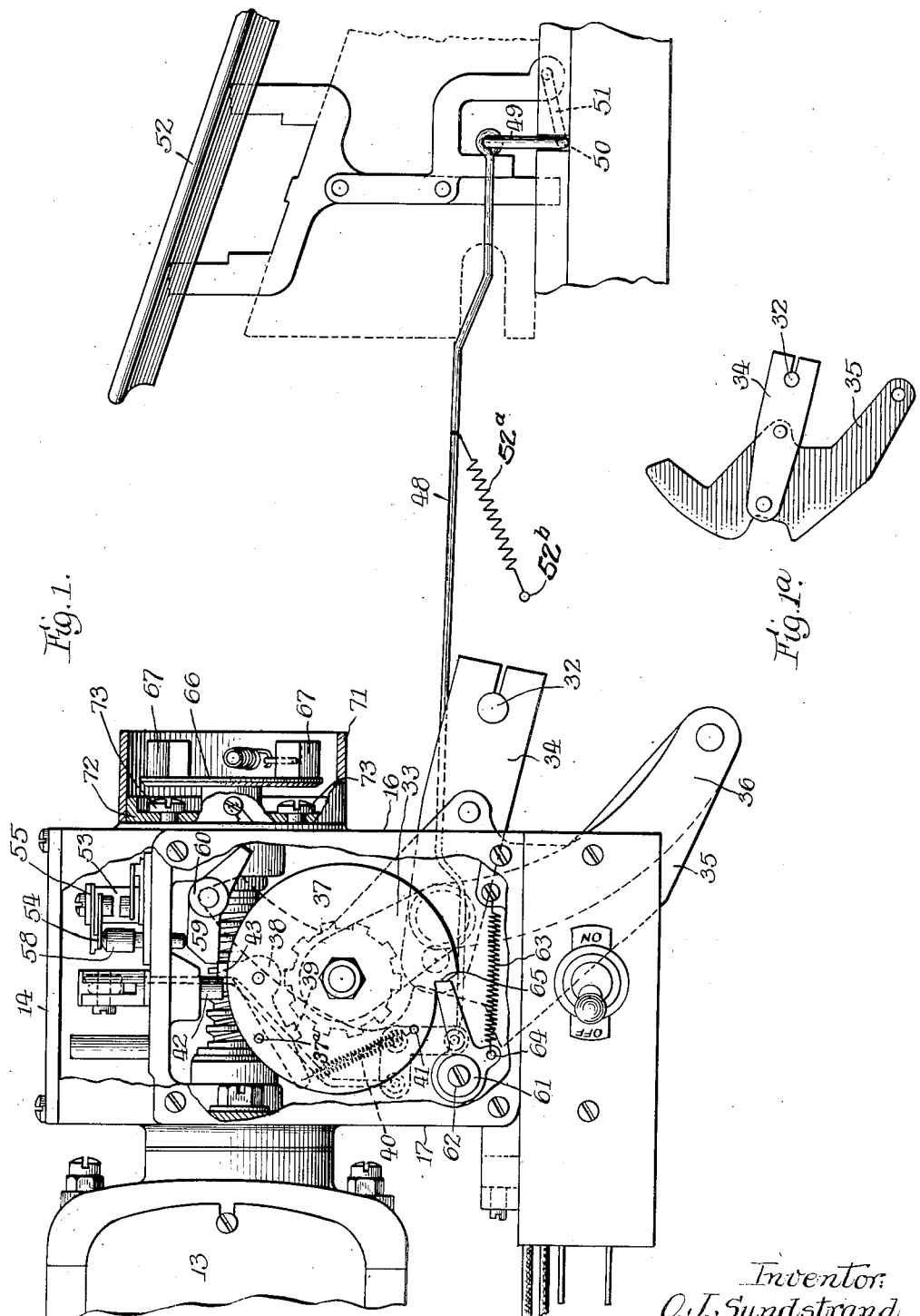

While the invention is applicable to machines of various types it is herein disclosed as applied to a machine of the general character set forth in the Sunstrand Patent No. 1,198,487 having a base 10 surmounted by a casing 11.

In the exemplary embodiment of the invention, the mechanism includes a housing 12 which is adapted to be mounted upon the base 10 immediately adjacent the left-hand side wall of the casing 11. To further contribute to the unitary and compact character of the device, a driving motor 13 of high starting torque is secured to and extends rearwardly from the housing 12 close to the case 11. Removable top and side cover plates 14 and 15, respectively, permit of access to the mechanism within the housing. Preferably the housing 12 is an integral box-like casting having front and rear walls 16 and 17 and top and bottom walls 18, 19 respectively.

Figure 5:
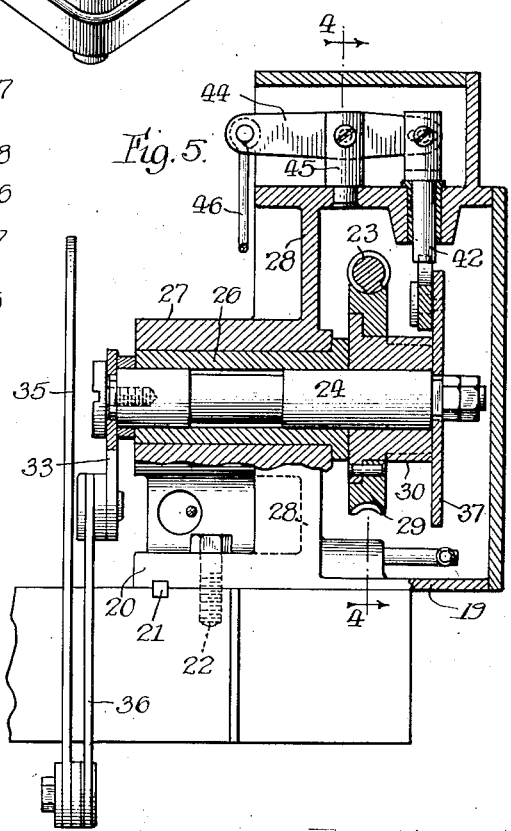
Fig. 5 is a vertical sectional view taken along the line 5—5 of Fig. 4.
Figure 6:
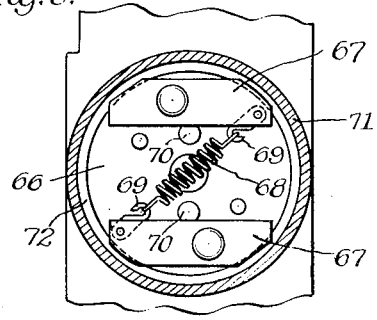
Fig. 6 is a vertical end view taken along line 6—6 of Fig. 4.

For the purpose of supporting the housing in fixed relation to the computing machine, the bottom 19 is formed with an inwardly extending projection 20 adapted to be received upon the upper surface of the base 10 as illustrated in Fig. 5. The lateral position of the housing, with respect to the base, is defined by a longitudinal key 21 which is fitted in the underside of the projection 20 and is received within a complemental groove provided in the base. The mechanism is secured against vertical displacement by screws 22 which extend through the projection 20 and engage the base.

Rotatably supported within the housing 12 is a driving member 23 and a driven member 24. The driving and driven members are operatively associated within the casing by intermediate mechanism which is adapted to communicate a positive movement of predetermined extent from the former to the latter member.

In the present instance, the driving member 23 consists of a worm which extends longitudinally of the housing and is journaled in bushings 25 in the opposite walls thereof. The rearward end of the driving member is suitably connected to the driving motor 13.

The driven member 24 comprises a laterally and inwardly extending shaft which, in the present instance, is rotatably supported within the housing 12 normally to the axis of the driving worm 23 in a sleeve 26 which is received within a cylindrical horizontal boss 27 formed integrally with a longitudinal web 28. Freely rotatable on the driven member 24 is a worm wheel 29 in meshing engagement with the worm 23. An elongated outwardly extending hub 30 is rigid with the worm wheel 29. In the outer end of the hub is an annular series of notches 31. The inner end of the driven member 24 is operatively connected to the main shaft 32 (Fig. 1) of the computing machine by means of crank arms 33 and 34 fixed to the driven member 24 and main shaft 32, respectively, an extension 35 fixed to the crank arm 34, and a link 36 connecting the arm 33 to the extension 35.

Figure 4:
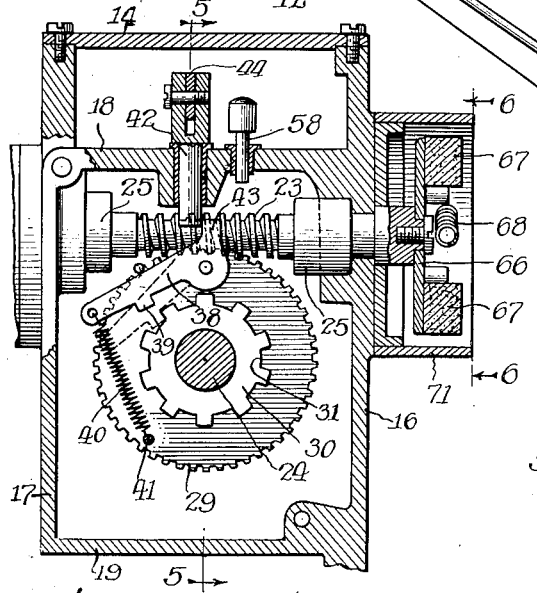
Fig. 4 is a vertical sectional view taken along line 4—4 of Fig. 5 and illustrates the mechanism in idle relation in full lines.

The means for communicating movement from the driving to the driven member includes, in the present instance, a disk 37 non-rotatably fixed to the outer end of the driven shaft 24. Pivotally mounted on the inner surface of the disk 37 is a pawl 38 which, in this instance, is provided upon its inner edge with a depending lug 39. The lug 39 is constantly urged into engagement with the notches 31 of the hub 30 by means of a spring 40 which acts between a pin 41 on the disk 35 and the extremity of the pawl to effect a tendency of that member to turn in a counterclockwise direction, as viewed in Fig. 4.

Engagement of the pawl 38 with the hub 30 will cause the disk 37, together with the shaft 24, to rotate with said hub and the worm wheel 29.

Figure 2:
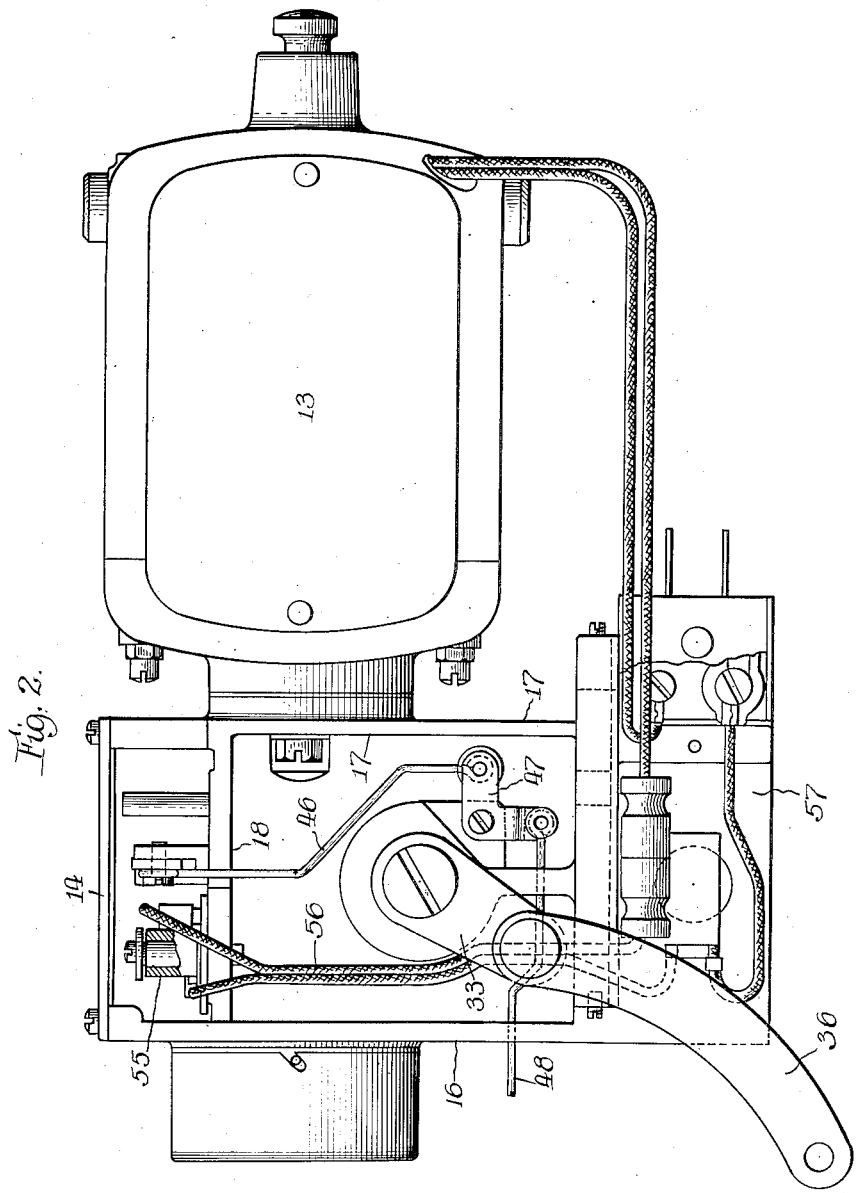
Fig. 2 is an elevation of the opposite side of the motor drive unit.
Figure 3:
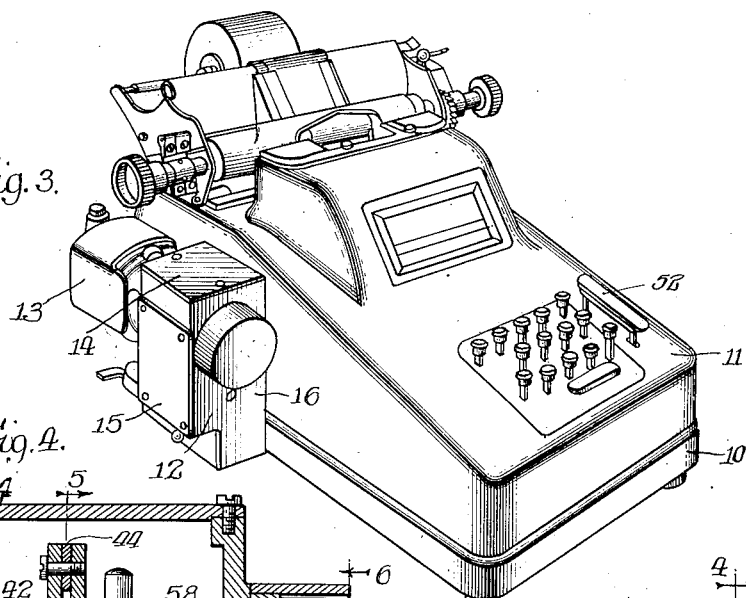
Fig. 3 is a perspective view of a Sundstrand adding machine with a motor drive embodying the features of the invention attached to its rear left side.

The means for controlling engagement between the driving and driven members comprises a vertical detent 42 reciprocably mounted in the top wall 18 with its longitudinal axis substantially in the plane of movement of the pawl 38. The lower end of the detent 42 is adapted to be projected into the path of a radially extending heel 43 which is formed integrally with the pawl 38. Abutment of the detent 42 and heel 43 tends to turn the pawl 38 clockwise in opposition to the action of spring 40 to effect a release of the lug 39 from the hub 30. Movement of the pawl 38 in a clockwise direction is limited by a pin 37$^a$ integral with the disk 37 which, in conjunction with the pivotal mounting of the pawl and its abutting contact with the detent 42, normally prevents counterclockwise movement of the driven shaft 24. The detent 42 is normally urged to its downward or blocking position and may be elevated to permit an engagement between the driving and driven members by suitable means which includes, in the present instance, a lever 44 pivotally mounted in a standard 45 and operatively connected to the upper bifurcated end of the detent 42. The lever 44 may be rocked by a link 46 (Fig. 2) operatively connected to a bell crank 47 which is pivotally mounted upon the housing 12. The opposed arm of the bell crank 47 is connected to a link 48 which in turn is pivoted to a crank arm 49 on the left hand end of a transverse rock shaft 50. On the right hand end of said shaft is a crank arm 51 which is connected to the motor bar 52. The motor bar is normally retained in its upper position and the detent 42 in its lower or blocking position by yieldable means comprising a spring 52$^a$ acting between link 48 and a pin 52$^b$ fixed to a stationary part of the adding machine.

Preferably the driving means is normally idle to prevent waste of power and unnecessary wear upon moving parts. To this end means is provided to automatically effect a closing of the power circuit to the motor momentarily prior to the action of the pawl 38 to effect a positive engagement between the driving and driven members. In the present instance, the circuit is closed by means including a switch 53 (Fig. 1) having a resilient contact fingers 54 anchored to a suitable terminal block 55. Lead wires 56 (Fig. 2), emanating from a fuse and switch box 57, are adapted to complete the circuit to the motor 13. The upper finger 54 tends to move into engagement with the lower finger to close the motor circuit. The upper finger overlies a vertically movable plunger 58, which is received in the top of the housing 12 and is slidable in a vertical plane substantially coincident with the plane of the pawl 38. Plunger 58 projects below the top wall 18 to engage the upper edge of an arm 59 of a bell crank 60 which is pivoted to the housing 12. The opposed arm of the bell crank 60 abuts against the housing to limit its movement in a counterclockwise direction under the influence of the plunger 58 and the resilient finger 54. In the rotation of the disk 37 the heel 43 of the pawl 38 is carried into engagement with the arm 59 just before the heel stops against the detent 42, thus raising said arm and the plunger 58 and thereby breaking the motor circuit.

Means is provided for determining the position in which the respective elements of the driving and driven mechanism shall come to rest, which means in this instance, comprise a dog 61 (Fig. 1) pivotally mounted upon the housing at 62. The dog 61 is maintained in wiping contact with the periphery of the disk 37 by a coiled spring 63 having one of its ends anchored to the housing and its other end connected to a hook 64 formed eccentrically of the pivot point of the dog. A shoulder 65 is provided on the disk 37 at such a point that it will be engaged by the end of the dog 61 a moment after the withdrawal of the lug 39 from the hub 30 due to the engagement of the heel 43 with the detent 42. The driven member is, therefore, blocked against clockwise or counterclockwise movement when the respective parts of the mechanism are in the position illustrated in Fig. 1.

Means is provided for preventing increases in the voltages impressed upon the power circuit of the driving motor from causing excessive speed of the driving member. In the present instance, said means consists of a governor comprising a disk 66 fixed to the forward end of the driving member 23. Friction blocks 67 are pivoted upon the forward face of the disk 66 eccentric of their respective centers and on a diameter of the disk.

The respective longer ends of the friction blocks 67 are yieldably connected by means of a coiled spring 68 acting between hooks 69 secured in their ends. Pins 70 mounted upon the surface of the disk 66 at points intermediate the pivotal points and the longer ends of the friction blocks, limit the pivotal movement of the friction members under the influence of the coiled spring. A friction drum 71 is removably attached to a collar 72 which is concentric with the driving member 23 and rigidly attached to the housing by means of screws 73. The friction blocks 67 are adapted to rotate about their pivots in opposition to the action of the spring 68 under the influence of the centrifugal force occasioned by rotation of the driving member 23. Thus, their ends will be pressed against the inner peripheral wall of the drum 71 to effect a braking action upon the driving member 23 and its motor in the event that the voltage rises above the normal point.

Considering the actuating mechanism to be at rest, as illustrated in Fig. 1, its operation is as follows: Depression of the motor bar 52 serves to elevate the detent 42 permitting the pawl 38 to turn counter-clockwise under the influence of the spring 40 thereby moving the heel 43 out of position under the lever arm 59, and placing the lug 39 on the periphery of the hub 30 or in one of the notches 31. The plunger 58 is accordingly permitted to be depressed under the influence of the upper resilient switch finger 54, whereupon the motor circuit is closed. The minute distance which heel 43 will move before permitting switch 53 to close, as compared with the relatively greater distance which lug 39 must traverse before engaging a notch 31 is such as to insure starting of the motor a moment before the load is assumed regardless of whether any one notch is alined with the lug. The motor imparts rotation to the driving worm 23 which is communicated to its associated worm wheel 29 and the hub 30, so as to drive the disk 37 and its associated driven shaft 24 in a counter-clockwise direction.

The rotary movement of the driven member under the influence of the driving member is continued until the heel 43 is again brought into abutting engagement with the detent 42 so as to rotate the pawl 38 and its lug 39 out of engagement with the hub 30. Momentarily, prior to the action of the detent 42 to effect a disengagement of the driving and driven members, the heel 43 of pawl 38 will contact with the lever arm 59 to elevate the plunger 58, thereby opening the circuit to the driving motor.

The positive character of the driving action throughout the complete cyclic operation of the machine eliminates the necessity of using a restoring spring to drive the machine on its back stroke and likewise dispenses with the use of a dash pot so that the power customarily wasted in overcoming the resistance of those devices during the forward stroke of the machine is conserved and the weight of the machine is proportionately diminished. It will also be evident that the elimination of the restoring spring and the dash pot permits of the use of a smaller driving motor than it has heretofore been possible to employ, resulting in a further reduction in the weight of the complete machine.

I have thus provided a motor-driven actuating mechanism for computing machines which is compact, simple in operation, and may be readily attached to such devices to effect a complete cyclic movement thereof under the positive driving action of a motor. It will also be evident that the device provides for automatically closing and opening the circuit to the motor as an incident to the cyclic operation of the driven element of the mechanism.

I claim as my invention:

1. An actuating attachment for computing machines comprising a unit for attachment to a computing machine frame, said unit comprising a driving worm, a driving motor forming a part of said unit and connected to said worm, a circuit for said motor including a switch tending to close the circuit, a driven shaft journaled in said unit and adapted to be operatively connected to a computing machine mechanism, and means in said unit to effect a driving connection between the driving worm and driven shaft and to control the circuit to said motor including a worm wheel in mesh with said driving worm and having a notched hub freely rotatable on said driven shaft, a disk rigid with said driven shaft, a pawl pivoted on said disk, a heel on said pawl, a spring urging said pawl into engagement with said hub, a detent normally interposed in the path of said heel to lift said pawl out of engagement with said hub, and a lever also in the path of said heel and operable to actuate said switch to open the circuit to said motor, said lever being supported by said heel to maintain said circuit open while the heel is in abutting engagement with said detent.

2. An actuating attachment for computing machines having, in combination, a housing, actuating mechanism including a driving worm and a driven shaft journaled in said housing, the driving worm having a connection with a driving motor, the driven shaft being adapted to be operatively connected to a computing machine mechanism, a circuit for said motor including a switch, and means in said housing to effect a driving connection between said driving and driven members and to control said circuit, said means comprising a worm wheel in mesh with said driving worm and freely rotatable on said driven shaft, a member rotatable with said driven shaft, and carrying a pivoted pawl, spring means to urge said pawl into driving engagement with said worm wheel, a manually operable detent normally interposed in the path of said pawl to disable said engagement, and a lever also in the path of said pawl to actuate said switch in the circuit to said motor.

3. A driving mechanism for calculating machines comprising, in combination, a normally stationary electric prime mover a circuit for said prime mover, a switch in said circuit, a driving worm connected to said prime mover, a worm wheel in mesh with said driving worm, a driven shaft adapted to be connected to a calculating machine mechanism, a disk mounted on said driven shaft for rotation in a plane parallel to the plane of said worm wheel, a pawl pivoted on said disk with its pivotal axis normal to the plane thereof, a spring urging said pawl radially inwardly into engagement with a part of said worm wheel, and a detent automatically operable to turn said pawl out of engagement with the part of said worm wheel and into abutment with a stationary part of said disk to effect a stopping of said driven shaft, said pawl also acting to open said switch as it is moved to said last mentioned position.

4. A driving mechanism for calculating machines comprising, in combination, an armature shaft, a driving worm connected to said armature shaft, a worm wheel in mesh with said driving worm, a normally stationary driven shaft coaxial with said worm wheel and adapted to be connected to a calculating machine mechanism, a disk rigid with said driven shaft and in bearing relation with a part of said worm wheel, a pawl pivoted on said disk and normally urged in one direction to engage a part of said worm wheel, a detent effective to turn said pawl in an opposite direction to disable said engagement, stop means on said disk to limit the movement of said pawl in the last mentioned direction to define with said detent a positive limit of rotation of said disk in one direction, and a detent effective to limit rotation of said disk in an opposite direction.

5. The combination with a computing machine having a base and an enclosing casing, of a driving mechanism including a housing mounted externally of and at the side of the casing and above the base, a driving worm journaled in said housing, a motor operatively connected with said driving worm, a circuit for said motor including a switch normally tending to close the circuit, a driven shaft journaled in said housing and adapted to be operatively connected to the computing machine mechanism and means in said housing to effect a driving connection between the driving worm and the driven shaft and to close the circuit to said motor including a worm wheel in mesh with said driving worm, a disk rigid with said driven shaft and adapted to rotate in a plane parallel to the plane of said worm wheel, and an element on said disk effective in one position to maintain said switch open and operable in a second position to effect an engagement between said driving worm and said driven shaft, and key means on said computing machine operable to control the position of said element.

6. The combination with a computing machine having a base and an enclosing casing, of a driving mechanism including a housing mounted externally of and at the side of the casing and above the base, a driving worm journaled in said housing, a motor operatively connected with said driving worm, a circuit for said motor including a switch normally tending to close the circuit, a driven shaft journaled in said housing and adapted to be operatively connected to the computing machine mechanism and means in said housing to effect a driving connection between the driving worm and the driven shaft and to close the circuit to said motor including a worm wheel in mesh with said driving worm, a disk rigid with said driven shaft and adapted to rotate in a plane parallel to the plane of said worm wheel and an element on said disk operable in one position to maintain said switch open and to limit movement of said disk in one direction, said element being operable in a second position to effect an engagement between said driving worm and said driven shaft, and key means on said computing machine operable to control said element.

7. In an auxiliary driving attachment for a computing machine having an enclosing casing, the combination of an electric prime mover, a circuit for said prime mover including a switch normally tending to close the circuit, an element normally tending to retain said switch in open position, a driven shaft adapted to be permanently connected to the computing machine and intermittently connected to the prime mover, and manipulative means adapted to actuate said element to initiate movement of said prime mover and simultaneously provide a driving connection between said prime mover and said driven shaft, said element automatically opening the switch in said circuit and disabling the connection with said prime mover in timed relation with a cyclic operation of the computing mechanism.

8. An actuating attachment for computing machines comprising a unit for attachment to a computing machine frame, said unit including a driving motor, a circuit for said motor, a switch in said circuit, a driven member journaled in a housing positioned forwardly of said motor, said driven member projecting laterally of said housing and being adapted to be permanently connected to a computing machine mechanism, and means effective to intermittently connect said driven member to the driving motor, said last mentioned means including a manually actuated element effective seriatim to close said switch to initiate movement of said driving motor, connect said driven member to said driving motor, open said switch and stop said driven member.

9. An actuating device for attachment to a portable, manually operated computing machine having a base and enclosing casing comprising, in combination, a housing adapted to be mounted externally of, and at the side of the casing above the base, a driven member journaled within said housing and operatively connected to said machine, a driving member rotatably supported within said housing and adapted to communicate a cyclic movement to said driven member, manually operated means on said machine to effect a connection between said driving and driven members, and automatically operable means within said housing to disable said connection at the end of a cyclic movement of said driven member.

OSCAR J. SUNDSTRAND.